(12) United States Patent
Perlman

(10) Patent No.: US 8,517,841 B2
(45) Date of Patent: *Aug. 27, 2013

(54) MASS STORAGE REPOSITORY FOR A WIRELESS NETWORK

(75) Inventor: Stephen G. Perlman, Palo Alto, CA (US)

(73) Assignee: OL2, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,563

(22) Filed: Aug. 16, 2012

(65) Prior Publication Data

US 2012/0309545 A1      Dec. 6, 2012

Related U.S. Application Data

(63) Continuation of application No. 12/148,433, filed on Apr. 18, 2008, now Pat. No. 8,246,470, which is a continuation of application No. 10/315,788, filed on Dec. 10, 2002, now Pat. No. 7,558,525.

(51) Int. Cl.
*G07F 17/32* (2006.01)

(52) U.S. Cl.
USPC .................................. 463/43; 463/42; 463/46

(58) Field of Classification Search
USPC .................................................. 463/40–43, 46
See application file for complete search history.

(56) References Cited

U.S. PATENT DOCUMENTS

| | | | |
|---|---|---|---|
| 5,606,359 A | 2/1997 | Youden et al. |
| 5,830,068 A | 11/1998 | Brenner et al. |
| 5,861,920 A | 1/1999 | Mead et al. |
| 5,903,735 A | 5/1999 | Kidder et al. |
| 5,920,692 A | 7/1999 | Nguyen et al. |
| 5,935,006 A | 8/1999 | Nakajima |
| 5,995,518 A | 11/1999 | Burns et al. |
| 6,037,983 A | 3/2000 | Au et al. |
| 6,134,590 A | 10/2000 | Perlman |
| 6,198,850 B1 | 3/2001 | Banton |
| 6,227,974 B1 | 5/2001 | Eilat et al. |
| 6,287,199 B1 | 9/2001 | McKeown et al. |
| 2001/0031092 A1 | 10/2001 | Zeck et al. |
| 2001/0034255 A1 | 10/2001 | Hayama et al. |
| 2001/0034743 A1 | 10/2001 | Thomas |

(Continued)

FOREIGN PATENT DOCUMENTS

| | | |
|---|---|---|
| EP | 1003313 | 5/2000 |
| JP | 11161571 | 6/1999 |
| JP | 2000057009 | 2/2000 |

OTHER PUBLICATIONS

Frauenfelder. "G-Cluster Makes Games to Go". The Feature: It's All About the Mobile Internet. Nov. 6, 2001.

(Continued)

*Primary Examiner* — Omkar Deodhar
(74) *Attorney, Agent, or Firm* — The Law Offices of Bradley J. Bereznak

(57) ABSTRACT

A video repository unit includes a plurality of disk drives arranged in a redundant array and circuitry to control writing/reading of video programs to/from the redundant array. A wireless transceiver receives video programs and transmits a selected video program to a remote viewer responsive to a request received by the wireless transceiver. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 7 Drawing Sheets

(56) References Cited

U.S. PATENT DOCUMENTS

2001/0039569 A1 11/2001 Bretscher
2001/0044339 A1 11/2001 Cordero et al.
2002/0110353 A1 8/2002 Potrebic et al.

OTHER PUBLICATIONS

Wu et al. "Transporting Real-Time Video Over the Internet: Challenges and Approaches". Proceedings of the IEEE, IEEE. New York, US. vol. 88. No. 12. Dec. 1, 2000. XP011044464. ISSN; 0018-9219.

Jongwon et al. "TCP-Friendly Internet Video Streaming Employing Variable Frame-Rate Encoding and Interpolation". IEEE Transactions on Circuits and Systems for Video Technology, vol. 10, No. 7, Oct. 2000, XP11014118A.

ITU-T. Annex C "Video Buffering Verifier" and Annex D "Features Supported by the Algorithm". ITU-T Recommendation H.262. Feb. 27, 2000. pp. 139-158. XP055062821.

Crovella et al. "Dynamic Server Selection In the Internet". 1995 Third IEEE Workshop on the, IEEE. Aug. 23, 1995. pp. 158-162. XP032307128.

MASS STORAGE REPOSITORY FOR A WIRELESS NETWORK

RELATED APPLICATIONS

This application is a continuation of Ser. No. 12/148,433 filed Apr. 18, 2008, now U.S. Pat. No. 8,246,470, which is a continuation of Ser. No. 10/315,788 filed Dec. 10, 2002, now U.S. Pat. No. 7,558,525, which application is related to Ser. No. 10/315,694, filed Dec. 10, 2002, now U.S. Pat. No. 7,493,078, and Ser. No. 10/315,460, filed Dec. 10, 2002, now U.S. Pat. No. 7,849,491, each of which is assigned to the assignee of the present application.

FIELD OF THE INVENTION

The present invention relates generally to the field of transmission of digital data; more specifically, to satellite communication systems and networks for distributing video data and for providing interactive services to geographically dispersed clients.

BACKGROUND OF THE INVENTION

Satellite communications systems have been widely deployed over the past several decades. By way of example, Direct Broadcast Satellite (DBS) services have increasingly expanded to provide a variety of video program services directly to people's homes, apartments, and offices. In a conventional direct-to-home (DTH) satellite communication system, one or more telecommunications satellites in geosynchronous orbit receive media content from a broadcast uplink center. The satellite then radiates microwave signal beams to send the media content across a geographical region of the planet. For example, in the case of satellite service providers like DirectTV® video programs are broadcast across a wide region of the continental United States from several satellites in geosynchronous orbit above the Earth's equator.

Subscriber homes in the U.S. typically utilize an outdoor antenna dish mounted to their roof or an exterior wall to receive the satellite-transmitted signals. A satellite receiver or set-top box within the home is connected to the antenna for acquiring the satellite carrier signal and displaying the video program content received from the satellite transmission. As is well known, the satellite receiver may include decompression, decryption, decoder, demodulation and other circuitry for converting the received signals into a format (e.g., high definition television (HDTV), standard definition television (SDTV), etc.) suitable for viewing on a display device by the subscriber. For example, for direct-to-home digital satellite carriers which conform to Digital Video Broadcast (DVB) standards, the satellite receiver is configured to receive a set of parameters that may include the polarization, symbol rate, forward error correcting (FEC) rate and frequency to acquire the satellite digital carrier. U.S. Pat. Nos. 6,473,858, 6,430,233, 6,412,112, 6,323,909, 6,205,185, and 5,742,680 describe various conventional satellite communication systems that operate in this manner.

Satellite transmissions are often grouped in channel sets, wherein each channel set spans a certain transmit band. The channel sets are typically isolated by different electromagnetic polarizations. For instance, channel sets may be transmitted with linear polarization (i.e., horizontal or vertical) or circular polarization (i.e., left-hand or right-hand). These channel sets are detected on a polarization-sensitive antenna assembly through a low-noise block converter (LNB) mounted opposite a parabolic antenna dish. The LNB may be configured, for example, to detect the horizontal or vertical polarized signals reflected from the antenna dish. The LNB connects to the satellite receiver unit or set-top box located inside the subscriber's home via a coaxial cable.

In some receiving systems two LNBs are provided to receive both channel sets so that multiple television sets within a home may view different program channels simultaneously. Examples of different satellite data receiving systems are found in U.S. Pat. Nos. 6,424,817 and 5,959,592.

One of the problems with satellite communication systems is that they generally require an unobstructed line-of-sight between the orbiting satellite and the receiving antenna dish. In the United States, for instance, satellites typically orbit above the equator and, are therefore "seen" by the antenna above the southern horizon. A home in a densely populated metropolitan region, however, may have its view of the southern sky obstructed by a tall building. In other cases, apartment dwellers living in units on the north side of a building may be precluded from mounting an antenna anywhere to receive satellite transmissions from a satellite orbiting above the southern horizon.

In other cases, landlords who own apartment buildings containing multiple units may be reluctant to permit tenants to mount multiple antenna dishes on their structure or route cable wires through the exterior and interior of the building. Routing of wires is also a problem in homes, particularly when multiple televisions are to receive programming services. The line-of-sight requirement and the problem of multi-dwelling units (MDUs) have therefore limited the number of homes that can receive digital services from satellite vendors.

An additional problem that satellite vendors generally face is the difficulty of providing interactive data services to their customers. Some specialized satellite service providers offer two-way data services, but these systems require the subscriber to purchase a fairly large antenna dish (e.g., 3-5 feet wide) with increased power demands for uplink transmission to the satellite. Another drawback is the inherent latency associated with signal transmission from Earth to the orbiting satellite, and then back down to Earth. This latency can produce sluggish system performance as compared to terrestrial cable systems, for example, when the user wants to access a web page containing large amounts of content and data.

Thus, there is a pressing need for new apparatus and methods for distributing satellite services and video content to the general population on an expanded basis. There is also a need for a communication network that provides additional services, such as interactive data services, to subscribers at a competitive cost and at a high performance level.

BRIEF DESCRIPTION OF THE DRAWINGS

The present invention will be understood more fully from the detailed description that follows and from the accompanying drawings, which however, should not be taken to limit, the invention to the specific embodiments shown, but are for explanation and understanding only.

DETAILED DESCRIPTION

The present invention is a pioneering advancement in the field of multimedia communication systems. By integrating a wireless transceiver into a satellite antenna assembly, the present invention provides, for the first time, a wireless local area network (WLAN) which both distributes a wide range of video services (digitally-encoded broadcast services, pay-per-view television, and on-demand video services, etc.) and provides two-way (i.e., interactive) data services to individuals located across a wireless coverage region.

In the following description numerous specific details are set forth, such as frequencies, circuits, configurations, etc., in order to provide a thorough understanding of the present invention. However, persons having ordinary skill in the satellite and communication arts will appreciate that these specific details may not be needed to practice the present invention. It should also be understood that the basic architecture and concepts disclosed can be extended to a variety of different implementations and applications. Therefore, the following description should not be considered as limiting the scope of the invention.

Figure 1:
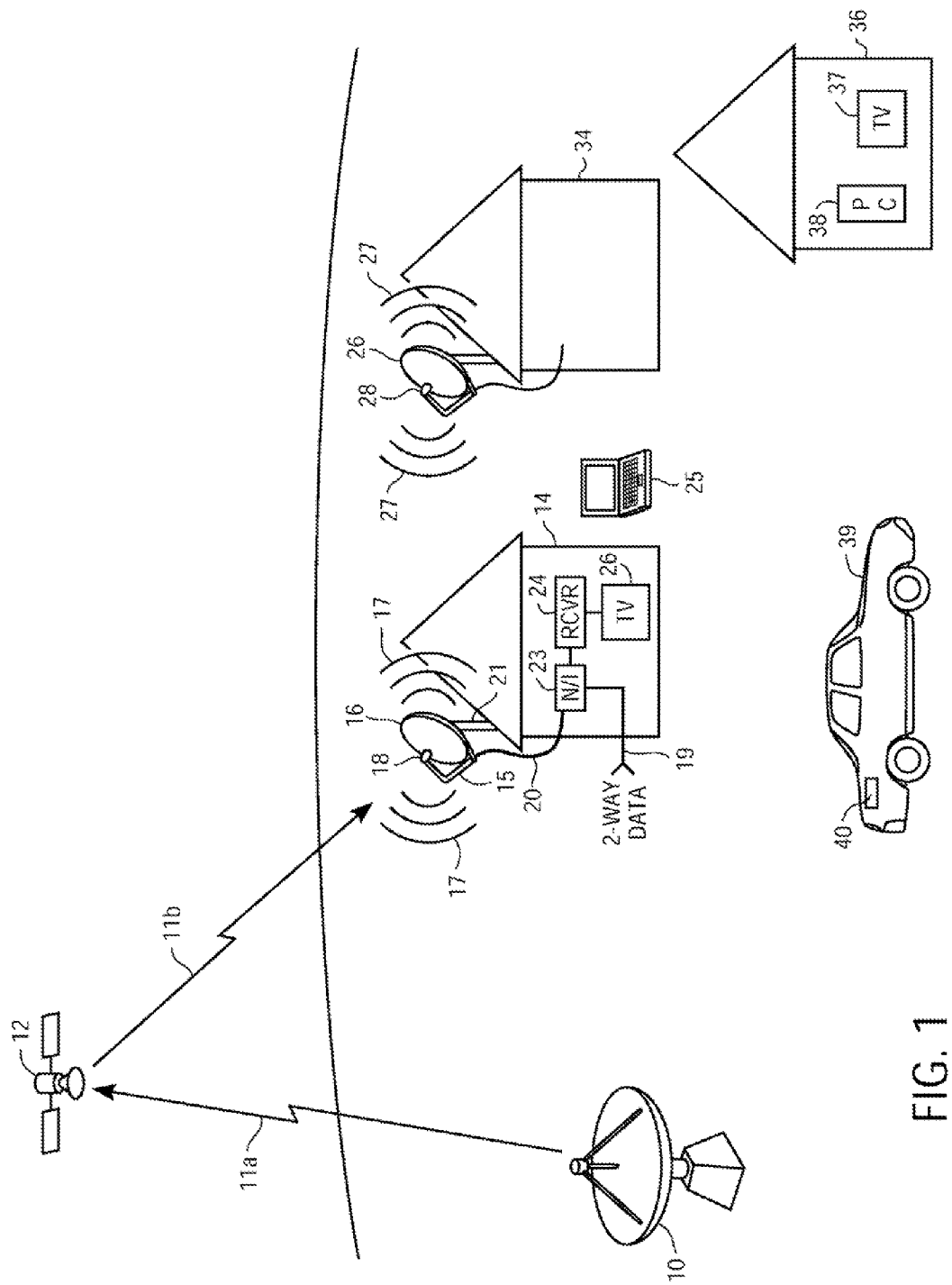
FIG. 1 is a conceptual diagram of a satellite communication system in accordance with one embodiment of the present invention.

With reference to FIG. 1, a conceptual diagram of a satellite communication system in accordance with the present invention is shown comprising a telecommunications satellite 12 positioned in a fixed, geosynchronous orbital location in the sky over the particular geographical region of the Earth. Satellite 12 utilizes standard solar panels to generate power for the satellite's resources which includes one or more transponders that provide telecommunication links (i.e., "uplinks" and "downlinks") to Earth-based stations and receivers.

Figure 2:
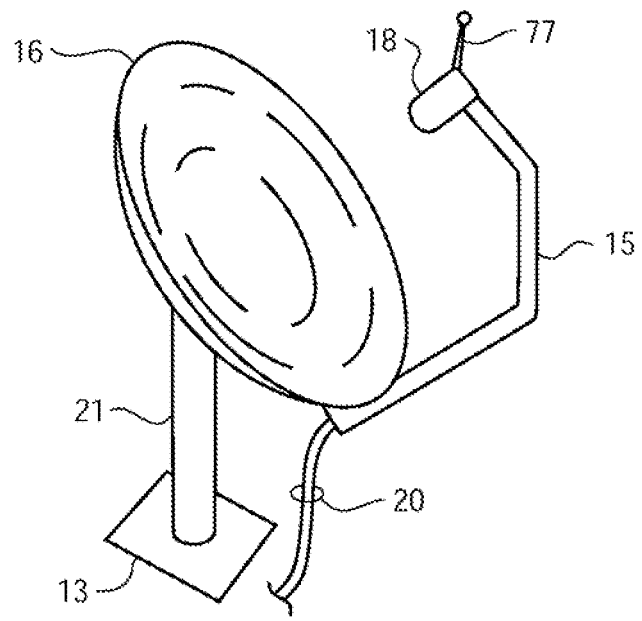
FIG. 2 is a perspective view of an antenna assembly according to one embodiment of the present invention.

For example, FIG. 1 shows a large antenna 10 that broadcasts video programs from an uplink center to satellite 12. This uplink signal is represented by arrow 11a. Satellite 12 transmits the broadcast signal (e.g., downlink 11b) across a coverage region of the Earth, where it may be received at a home 14 equipped with an outdoor antenna assembly coupled to electronics for displaying the video programs. The antenna assembly, which is also shown in FIG. 2, includes a support 21 attached to a parabolic or concave reflector dish 16, which is aimed to the location in the sky where satellite 12 is positioned in geosynchronous orbit above the earth. Support 21 may include a base plate 13 to facilitate mounting of the antenna assembly to the exterior (e.g., roof) of house 14. An arm 15, attached to either dish 16 or support 21, extends to position a signal unit 18 at a focal point of the reflector dish 16. An antenna 77 for wireless transmissions is also shown attached to unit 18. Unit 18 converts the electromagnetic radiation reflected from dish 16 into electrical signals carried by one or more conductors 20 to a network interface unit 23 or satellite receiver 24 within home 14. Receiver 24, for example, converts the satellite transmission signals into a format for display on television 26.

Figure 3:
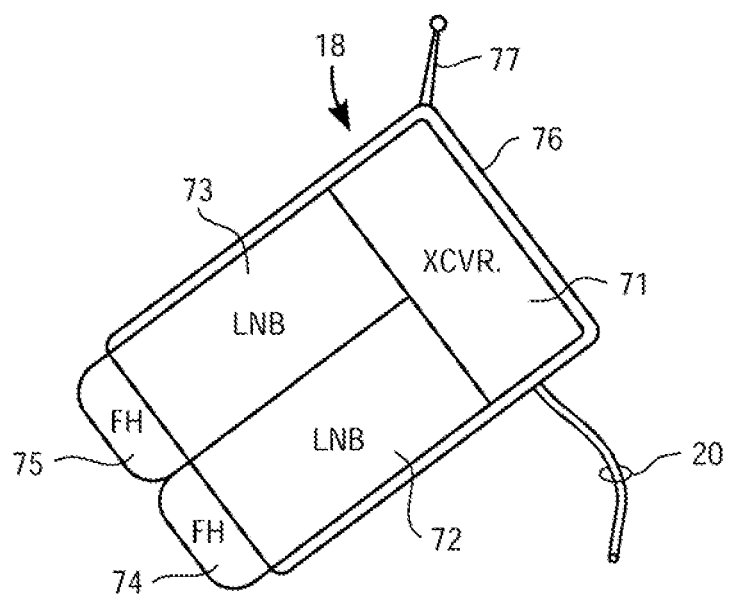
FIG. 3 is a more detailed view of the components comprising the signal unit of the antenna assembly shown in FIG. 2.

With reference to FIG. 3, there is shown an exemplary embodiment of signal unit 18 in accordance with the present invention comprising a pair of low-noise block converters (LNBs) 72 & 73 and a wireless transceiver 71 mounted in a case or housing 76. Wireless transceiver 71 has an associated antenna 77 to effectuate wireless transmissions. Feed horns 74 and 75 associated with LNBs 72 & 73, respectively, protrude from a side of housing 76 that is positioned nearest to reflector dish 16. Alternatively, the signal unit 18 may utilize a single feed horn coupled to one or more LNBs. Other embodiments may include multiple transceivers, each having its own associated wireless antenna. For instance, an alternative embodiment may comprise a pair of LNBs with an associated pair of wireless transceivers, each having its own wireless antenna.

In this example, LNBs 72 & 73 may be configured to receive horizontally and vertically polarized satellite transmission signals. Cable 20 connects with the LNBs and transceiver 71. (It should be understood that within the context of this disclosure, the term "cable" is used to refer to one or more wires and that such wires may comprise coaxial wires of a type known as RG-6, or a similar type.)

It is appreciated that in other embodiments unit 18 may comprise a single LNB and a wireless transceiver. In still other embodiments, unit 18 may include four or more LNBs and one or more wireless transceivers mounted together.

According to one embodiment of the present invention, wireless transceiver 71 operates in compliance with IEEE specification 802.11a, 802.11b, 802.11g, etc., to provide high-speed networking and communication capability to computers, televisions, and other devices compatibly equipped to receive such wireless signals. Other embodiments may operate in compliance with variant specifications that are compatible with IEEE specification 802.11a, 802.11b, or 802.11g, and which provide for wireless transmissions at high-bandwidth video data rates (e.g., about 2 Mbps or greater). For the purposes of the present application, IEEE specification 802.11a, 802.11b, 802.11g, and Industrial, Scientific, and Medical (ISM) band networking protocols are denoted as "802.11x". Other non-ISM bands wireless network protocols could be utilized as well. Transceiver 71 facilitates network connectivity to users located within a surrounding range, allowing them to receive satellite broadcast programs, pay-per-view services, on-demand video, Internet access, and other interactive data services, thus obviating the need for a wired connection to individual users.

In the example of FIG. 1, transceiver 71 operates over the license-free 5 GHz band (e.g., 5725 MHz to 5850 MHz) to provide upwards of 54 Mbps of bandwidth in good transmission conditions. IEEE specification 802.11a allows for a high-speed wireless transmission of raw data at indoor distances of up to several hundred feet and outdoor distances of up to ten miles, depending on impediments, materials, and line-of-sight. 802.11a has twelve channels (eight in the low part of the band for indoor use and four in the upper for outdoor use) which do not overlap, allowing for dense installations. According to the present invention, individual users may receive transmissions from transceiver 71 using hardware equipment available from a number of vendors. For example, Proxim, Inc. manufactures and sells the Harmony 802.11a PCI card that provides wireless broadband networking at a data rate of 54 Mbps.

In another embodiment, transceiver 71 operates in compliance with IEEE specification 802.11g over the license-free 2.46 GHz band.

As shown in FIG. 1, wireless signals 17 may be transmitted from unit 18 of the antenna assembly mounted on house 14 to a nearby laptop computer 25 installed with a PC card or a PCI card that is 802.11x compliant. Similar equipment may be installed into slots of a personal computer 38 or a television 37 to provide connectivity to network services in a house 36 that is located within the neighboring range of the wireless transceiver, despite the fact that house 36 does not have a satellite antenna dish or is not otherwise wired to receive such services. This means, for example, that someone may access their electronic mail from any location within the full extent of the wireless network since the transmission signals pass easily through walls and glass.

In the example of FIG. 1, house 36 may be located outside of the signal range of wireless transmission signals 17, but within the range of the wireless signals 27 from the transceiver mounted in unit 28 of antenna assembly 26 on top of a neighboring house 34. In such a case, the transceiver within unit 28 may function as a repeater or hub for house-to-house transmissions; that is, to relay the media content and interactive services provided at home 14 to users at home 36 and elsewhere. Through the use of transceivers 71 functioning as repeaters, content and two-way data services may be distributed to end users located at considerable distances from the original service connection source. In other words, a neighborhood of antenna assemblies that include wireless transceivers can be used to create a network that provides distributed video program and interactive data connectivity. Homes installed with an antenna assembly according to the present invention may still act as a house-to-house repeater for the neighborhood as part of a "roof-hopping" scheme, even though they may not have an immediate need for wireless communications. Later on, those homes may simply add the appropriate hardware (e.g., wireless communication card, network interface box, etc.) to take advantage of the additional services such as interactive data provided by wireless connectivity.

It should be understood that according to the present invention, the individual satellite antenna assemblies need not be located on homes or other buildings; instead, they may be positioned on existing telephone poles, or mounted on other structures with dedicated, stand-alone hardware. Additionally, stand-alone wireless transceivers that function solely as signal repeaters may be physically distributed in a geographic region or throughout a large building wherever power is available to provide network connectivity that extends throughout the region or area.

Figure 4:
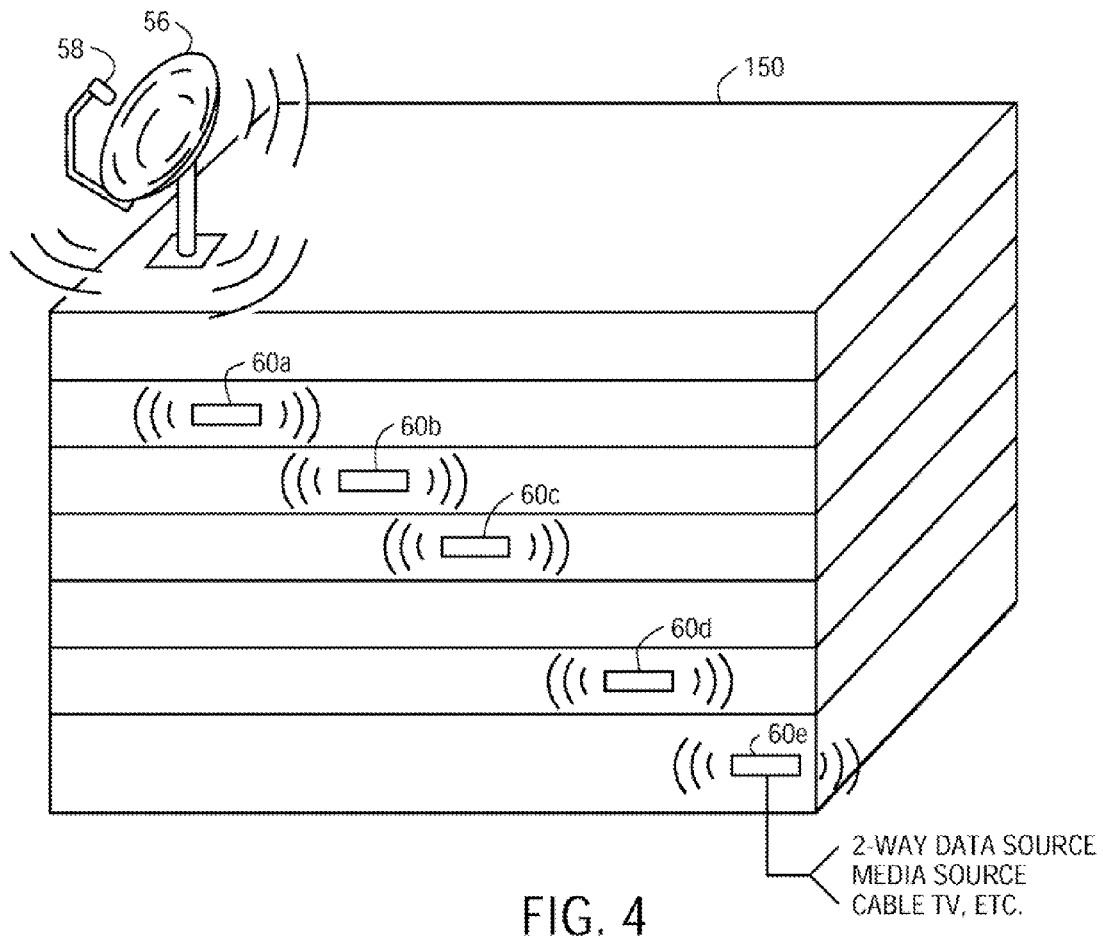
FIG. 4 is an example showing an application of the present invention to a multi-dwelling unit.

FIG. 4, for example, shows a large apartment building 50 with a satellite antenna assembly that includes a reflector dish 56 and a wireless transceiver mounted in signal unit 58. (The electronics that provides power and command/control signals for the antenna assembly is not shown in FIG. 4 for clarity reasons.) A series of repeaters 60a-60e are located on various floors throughout the building to distribute signal transmissions to/from the transceiver of unit 58 to each of the multiple apartment units within building 50. A broadband, two-way data service connection (e.g., DSL) is provided to an 802.11x wireless transceiver/repeater 60e. Thus, subscribers located anywhere within building 50 may connect to the DSL service via this wireless transmission. Similarly, two-way data service connectivity is provided to others within the range of the transceiver of unit 58 of the antenna assembly mounted on the roof of building 50 (or to anyone in a neighboring region reached via roof-hopping signal repeating). In a metropolitan region a single satellite antenna assembly with integrated wireless transceiver can therefore distribute high bandwidth services to residents of neighboring buildings, even though those neighboring buildings may not have a satellite antenna or be otherwise wired to receive those services.

Additionally, wireless transceiver/repeater 60e may be connected to receive video content from some media source, e.g., a Digital Versatile Disk ("DVD") player, or cable television programming. In the later case, for instance, wireless transceiver/repeater 60e may include a cable modem equipped with an 802.11x transmitter. These alternative or additional services may then be distributed in a similar manner described above.

FIG. 1 also illustrates another extension of the network provided by the present invention; wherein media content may be distributed to an 802.11x compliant receiver unit 40 installed in the trunk of an automobile 39, or other mobile vehicle. Unit 40, for instance, may include a hard disk drive to store video programs received from wireless transmission signals 17 when automobile 40 is parked, say, overnight in a garage. These programs can then be viewed by rear-seat passengers on a trip the following day.

With continued reference to the example of FIG. 1, two-way data service is shown being provided by cable 19 connected to a network interface unit 23. Cable 19 may provide a direct subscriber line (DK) connection, for instance, which may then be distributed to subscribers in the surrounding range of wireless signals 17. Thus, according to the present invention a user of laptop computer 25, who may be located outdoors or at a nearby café, can access the Internet, watch a pay-per-view film, or receive a multitude of other multimedia services.

Alternatively, network interface unit 23 may be connected to a cable broadcast service provider (e.g., cable television) through an Ethernet or Universal Serial Bus (USB), or similar connection, thereby enabling wireless access of those cable services to subscribers within the range of the wireless network. This means that a subscriber may watch their favorite television program or a pay-per-view movie from a laptop computer or television while outdoors, in a café, or in some other building, within the wireless coverage region without the need for a direct-wired cable connection. Distribution of cable services may be implemented with a cable modem device that includes an 802.11x transmitter. It is appreciated that additional circuitry for encrypting the video and data information may also be included to thwart pirates and interlopers.

Figure 5:
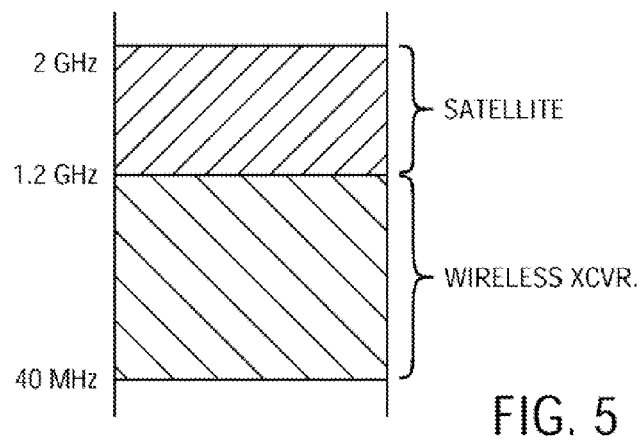
FIG. 5 illustrates the spectrum band utilized for cable communications with the wireless transceiver in accordance with one embodiment of the present invention.
Figure 6:
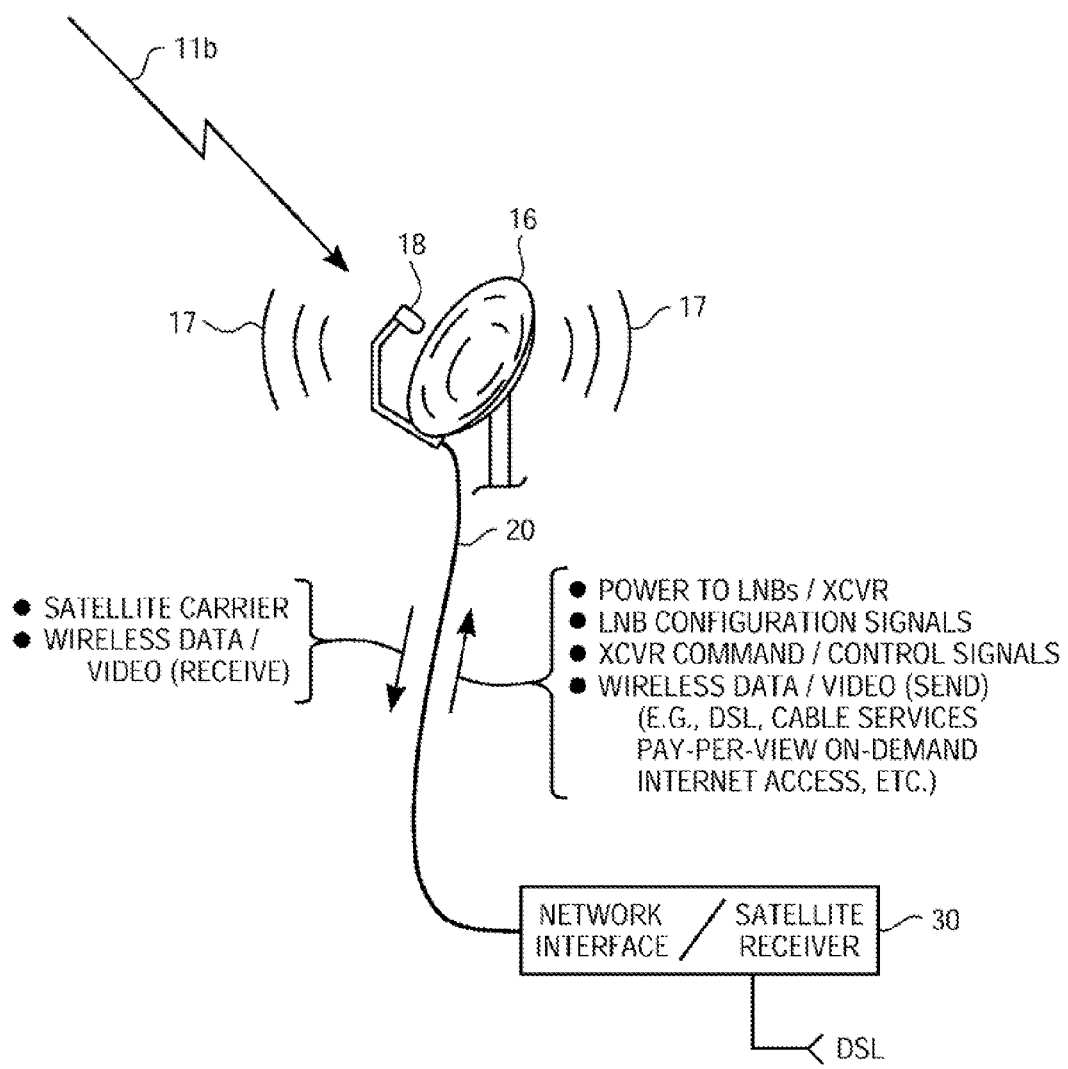
FIG. 6 depicts the type of information and signals transmitted between the network interface/satellite receiver device and antenna assembly according to one embodiment of the present invention.

Network interface unit 23 provides power to and communicates with transceiver 71 of unit 18 via cable 20. Although the embodiment of FIG. 1 shows network interface unit 23 connected to satellite receiver 24, alternatively both devices may be integrated in to a single device 30, as shown in FIG. 6. In either case, the network interface unit communicates with the transceiver using spectrum that is not otherwise utilized in cable 20. Since satellite receivers tend to operate in the spectrum from about 1.2 GHz to about 2 GHz, the spectrum below 1.2 GHz, down to about 40 MHz, may be used for communications with the wireless transceiver. This spectrum band is illustrated in FIG. 5.

It should also be understood that although FIG. 1 shows a direct connection between satellite receiver 24 and television 26, alternatively, video services may be provided to any 802.11x compliant television (e.g., installed with an 802.11x adapter card) located within the house or surrounding wireless coverage region.

FIG. 6 depicts the type of information and signals carried by cable 20 between network interface/satellite receiver device 30 and unit 18 of the antenna assembly of the present invention. Many techniques are well known in the electronics and communications arts for transmitting such signals, such as QPSK and QAM modulation. As shown, satellite signals received by the antenna assembly are provided to device 30 via cable 20. Additionally, wireless transmissions received by transceiver 71 are coupled to device 30. Device 30 provides power to the LNBs and transceiver, LNB configurations signals, transceiver command and control signals, and wireless data via cable 20. By way of example, FIG. 6 shows device 30 having a DSL connection that may provide Internet access to users within the surrounding range of the transceiver of unit 18.

Figure 7:
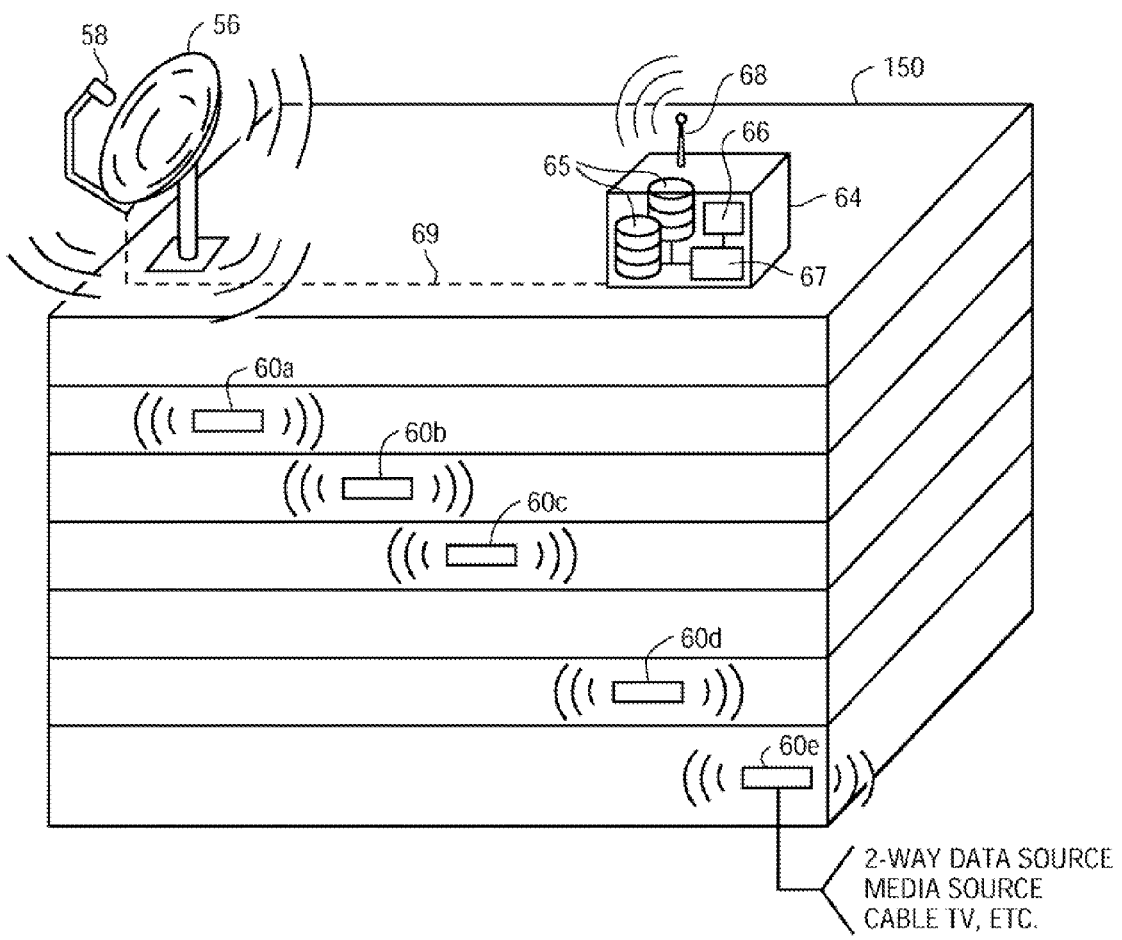
FIG. 7 shows the example of FIG. 4 optionally including a mass storage repository according to another embodiment of the present invention.
Figure 8:
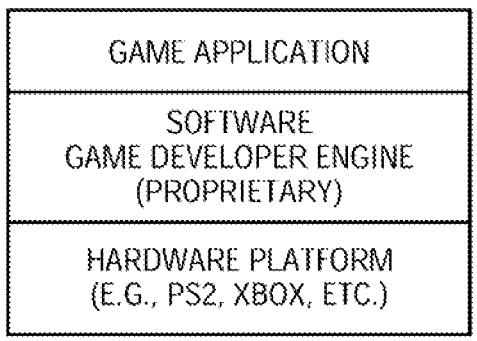
FIG. 8 illustrates a model relationship between hardware and software layers for video game applications.

FIG. 7 illustrates the MDU example of FIG. 4, but with a specialized mass storage repository unit 64 installed on the rooftop of building 50. Repository unit 64 comprises a number of hard disk drives (HDDs) having a large total storage capacity (e.g., 10 terabytes) arranged as a RAID ("Redundant Array of Inexpensive Disks") 65 that functions as a media library apparatus. An 802.11x compliant wireless transceiver 66 is also included in repository unit 64 along with various electronics 67 coupled to both RAID 65 and transceiver 66. Electronics 67 may comprise a microcomputer including a processor (CPU), a ROM, a RAM, etc., to control the data read/write processing by the HDDs and to control the operation of transceiver 66. Electronics 67 may also include data compression/decompression circuitry for certain video and data applications. Still other embodiments may include encryption/decryption circuitry for receiving and sending transmissions in a secure manner. The RAID 65, transceiver 66, and electronics 67 are all housed in rugged, weather-resistant enclosure providing a suitable environment for the HDDs and the other circuitry.

Repository unit 64 may communicate via wireless transmission utilizing wireless transceiver 66 connected to a wireless antenna 68 mounted on top of unit 64. Alternatively, unit 64 may be coupled with signal unit 58 via a wire connection 69 (e.g. CAT-5) to utilize the transceiver in signal unit 58 for wireless communications.

In an alternative embodiment, repository unit 64 may be attached to the satellite antenna assembly to directly utilize the wireless transceiver installed in signal unit 58.

The purpose of RAID 65 is to store recorded media content (e.g., pay-per-view movies, videos, DVDs, special event programs, etc.). This content can be accumulated over time in a "trickle feed" manner from wireless transceiver 66, which may receive content from various sources such as satellite transmissions, media players, cable television, Internet, etc. Over time, repository unit 64 may store such large volumes of video programming. Anyone having the capability to access the wireless network can pay a fee to receive a particular show, movie, or viewable program stored in repository unit 64 on an on-demand basis.

Additionally, because of the interactive capabilities of the wireless network, the subscriber or user may communicate with unit 64 to provide commands such as "pause", "fast forward", "rewind", etc. Indeed, because of the large storage space available, live broadcast programs available through the WLAN described previously may be manipulated using such commands, thereby providing enhanced viewing flexibility to the user. Hard disk drive failures, which often plague in-home digital video recorders (DVRs), are not a problem because of the redundancy protection built into the RAID. Should a particular hard disk drive fail during operation, the remaining disk drive units simply take over until the repository unit can be serviced, at which time the failed drive can be replaced.

Repository unit 64 may also function as an archive storage apparatus for individuals within a local area to utilize as a storage facility for back-ups of personal data. For example, personal data such as photographs, important documents, books, articles, etc. may be transferred into a reserved space in the RAID. Various well-known security features may be built into repository unit 64 to maintain personal security of the backed-up data for each user.

It is also appreciated that repository unit 64 may be physically located somewhere other than on the rooftop of a building of MDUs. For instance, instead of being attached to or nearby a rooftop antenna assembly, repository unit may be located in a top floor space, in a basement, or in a ground level facility.

Figure 9:
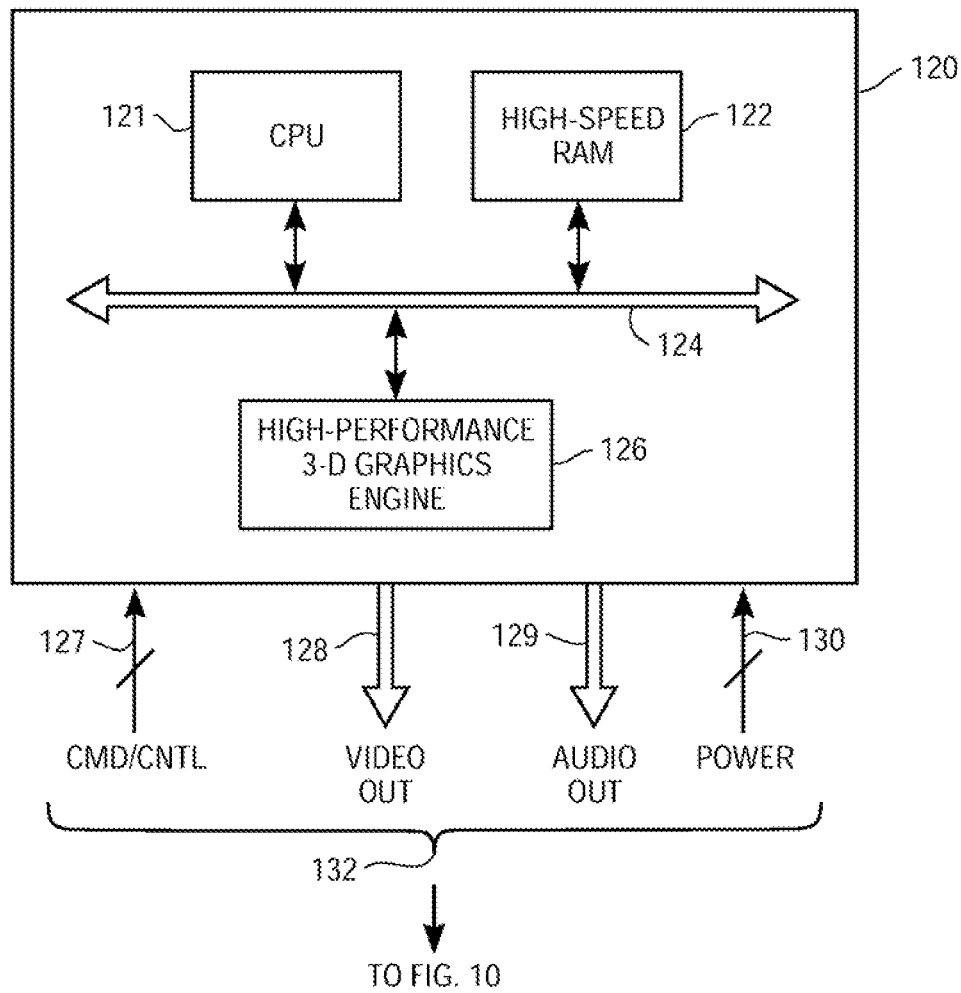
FIG. 9 is a circuit diagram of a video game card in accordance with one embodiment of the present invention.
Figure 10:
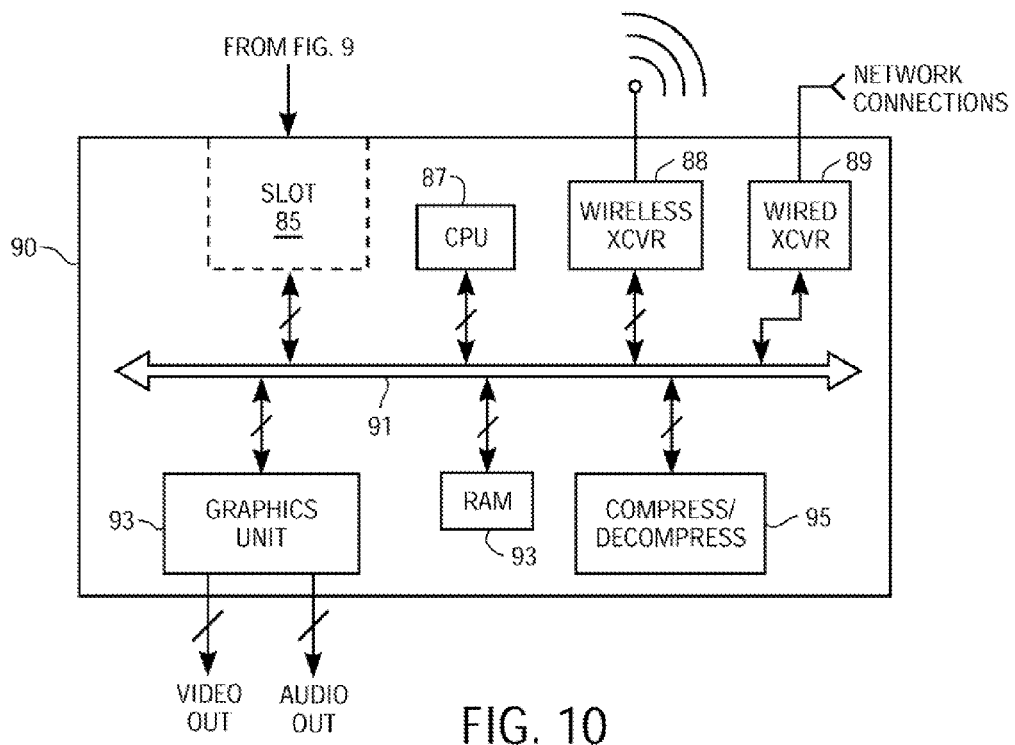
FIG. 10 is a detailed circuit diagram of a set-top box architecture for playing video games in accordance with one embodiment of the present invention.

FIG. 9 is a circuit block diagram of a game card 120 that provides a universal game platform that can be inserted into a slot of a compatible electronic device, such as the set-top box 90 shown in FIG. 10. In one embodiment, game card 120 may comprise a high-bandwidth PCMCIA or PC card manufactured in accordance with a universal standard approved by game software developers. This allows game card 120 to run any game developed by a software game developer in compliance with the universal standard. The video games may be downloaded directly to set-top box 90 via wired or wireless transmission, thus obviating the need to purchase an optical disk for each video game. This aspect of the present invention is discussed in more detail below.

Game card 120 has the computing resources needed to support advanced, high-performance games, including a central processing unit (CPU) 121, high-speed RAM 122, and a high-performance 3-D graphics engine 126. By way of example, CPU 121, RAM 122, and graphics engine 126 are shown coupled to high-speed bus 124 for transfer of instructions and data. Game card 120 couples with set-top box 90 via an interface 132 that includes command and control lines 127, power lines 130, and high-speed video and audio outputs 128 and 129, respectively. Interface 82 provides full bandwidth video output rates. For example, in one embodiment game card 120 may run at a clock rate of about 12.27 MHz with 24-bits of color to provide video data at a rate of 288 Mbps.

FIG. 10 is a detailed circuit block diagram that shows one embodiment of set-top box 90 that functions as a video game player according to the present invention. Set-top box 90 includes a slot 85, which is coupled to bus 91, for accepting game card 120. Slot 85 provides a compatible interface connection with interface 132 of card 120. Set-top box 90 also includes a CPU 87, a relatively low-speed RAM 94, and a graphics unit 93, each of which is coupled to bus 91. Graphics unit 93 produces video and audio outputs signals that may be coupled to a television, for example, or some other display unit suitable for playing a selected video game. CPU 87, RAM 94, and graphics unit 93 function to provide a user interface and a graphics path to a display screen for the playing of video games on the high-performance platform provided by game card 120.

Figure 11:
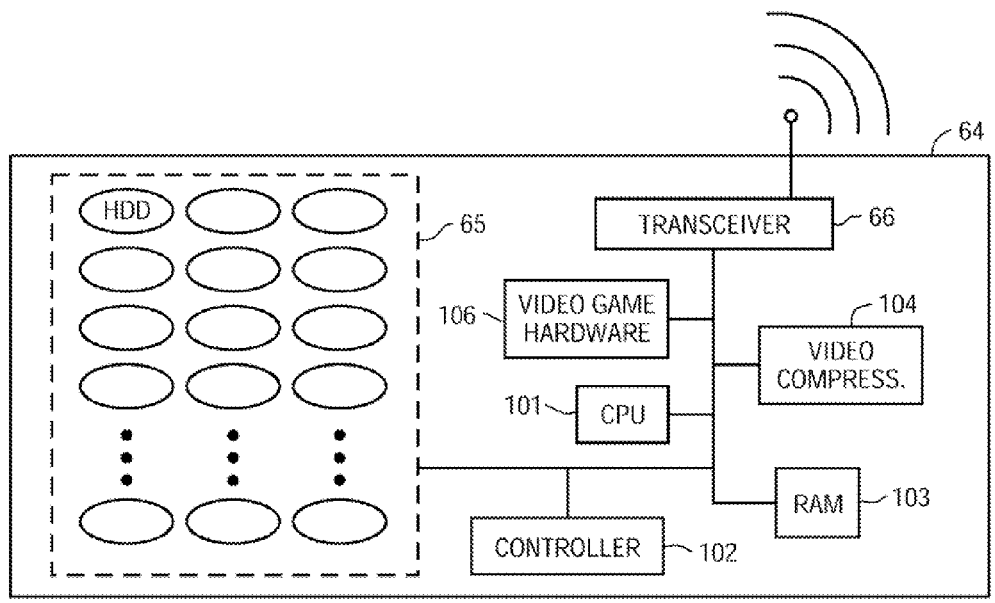
FIG. 11 is a detailed circuit diagram of a mass storage repository that functions as a video game server in accordance with one embodiment of the present invention.

Video games may be downloaded in the embodiment of FIG. 10 utilizing a wireless transceiver 88, which may operate as a 802.11x-compliant device. By way of example, video games may be downloaded from a broadband connection provided via a WLAN, as described previously. Alternatively, transceiver 88 may receive video games from a satellite transmission link, or a cable modem connection, via wireless transmission. Another possibility is to download games via a wired transceiver, such as from transceiver 89 located in repository unit 64, as shown in FIG. 11. Wired transceiver 89 may operate in compliance with Ethernet, DOCSIS, DSL, or other protocols.

In certain applications, set-top box 90 may optionally include a compression/decompression unit 95 coupled to bus 91 to compress video data prior to transmission, or to decompress video data after reception, via transceiver 88.

Video games may be played interactively between first and second players using wireless transceiver 88 or wired transceiver 89. The first player may provide input commands through a command/control module coupled to set-top box 90. For example, set-top box 90 may include an infrared (IR) unit (not shown) to receive IR input command and control signals from a player located in the same room. The IR unit may be coupled to CPU 87 to process the player commands (e.g., movement buttons, joystick commands, etc.) received from a remote game controller unit. The second player may be located anywhere within the surrounding range of the WLAN (in a neighboring house or building).

Still another option is to include a DVD or CD-ROM drive in set-top box 90 for playing/loading software video games.

Practitioners in the art will appreciate that the combination of a specialized game card that provides a universal game platform with a compatible set-top box for downloading and playing specific games offers numerous advantages. For instance, since the graphics capabilities of video games tend to evolve at a much faster pace as compared to the set-top box (which may have a useful life of ~8-10 years), each time the graphics platform evolves to accommodate a newer generation of games, the old game card may simply be swapped for the newer version. The new game card can be used to play the newer generation of games and the old card retained to play the previous generation games. Since the display path provided by the set-top box remains the same for the graphics generated across different generations of the game card, the set-top box does not need replacement or substitution.

In other instances, a person may purchase a set-top box that functions as a satellite receiver or as a digital cable receiver unit, but which is adapted with a slot for accepting a game card in accordance with the present invention. Initially, the person may not wish to utilize the box's game playing capability. However, when the person does desire to add game playing to his box, he may simply purchase a game card that provides the necessary computing capability and insert the card into the interface slot provided by the set-top box.

As a practical matter, it should be understood that due to the very high data rates involved, set-top box 90 may also include any of a number of well known heat-dissipation mechanisms, such as fans, vents, heat sinks, active cooling systems, and so on. Set-top box 90 may be equipped with a large power supply to furnish the power necessary for running high-performance video games. Alternatively, game card 120 may be configured with a rear power jack for connection to a dedicated power supply.

FIG. 11 is a circuit block diagram of a video repository unit 64 that may function as a video game server in accordance with one embodiment of the present invention. In this embodiment, RAID 65 stores a library of video games that may be sent to a remote user via transceiver 66. The remote user may also play interactive games with another user via wireless transmission through transceiver 66.

In the embodiment of FIG. 11, repository unit 64 is shown including a CPU 101, a RAM 103, and a disk controller unit 102 interconnected to RAID 65 as previously described. An optional video compression unit 104 is also shown. Video compression unit 104 provides low latency (i.e., <~80 ms) data compression of video for high "twitch-action" games (<150 ms for slower games). Video compression unit 104 may be coupled directly to a wired or wireless transceiver for transmission of game data. Also shown is a video game hardware unit 106, which includes one or more high-performance video games that may be loaded to execute on a corresponding set of game cards, such as game card 120 described previously.

Configured in this manner, repository unit 64 functions as a video game server for remotely located players who may communicate commands and receive video data via wired or wireless transmissions with unit 64. For example, one or more persons may submit a request to play a particular video game stored in the library of repository unit 64. That game would then run on the game card installed in the repository unit, with the commands and video data transmissions being communicated between repository unit 64 and remote location(s) utilizing wireless or wired transceivers. In addition, repository unit 64 may also provide other media services (television, pay-per-view, on-demand programs, etc.) to persons in the surrounding area via wireless connection.

It should be further understood that although the present invention has been described in conjunction with specific embodiments, numerous modifications and alterations are well within the scope of the present invention. Accordingly, the specification and drawings are to be regarded in an illustrative rather than a restrictive sense.

I claim:

1. A computer-implemented method comprising:
   executing at least one video game or application on a server, video game data being produced therefrom;
   compressing the video game or application data with a finite latency of 150 ms or less;
   transmitting the compressed video game or application data to at least one client device associated with a corresponding user via a network, the at least one client device being geographically remote to a building where the server is located.

2. The computer-implemented method of claim 1 wherein the transmitting of the compressed video game or application data comprises wirelessly transmitting the compressed video game data.

3. The computer-implemented method of claim 1 wherein the network comprises a wired network.

4. The computer-implemented method of claim 1 wherein the network comprises the Internet.

5. The computer-implemented method of claim 1 further comprising encrypting the compressed video game or application data prior to the transmitting.

6. The computer-implemented method of claim 1 wherein the at least one client device comprises a set-top box.

7. The computer-implemented method of claim 6 further comprising decompressing, by the set-top box, the compressed video game or application data.

8. The computer-implemented method of claim 1 wherein the video game or application comprises a twitch-action video game.

9. The computer-implemented method of claim 1 wherein the video game or application data is compressed with a finite latency of 80 ms or less.

10. The computer-implemented method of claim 1 further comprising downloading the at least one video game or application to a storage unit.

11. The computer-implemented method of claim 10 wherein the storage unit comprises a redundant array of inexpensive disks (RAID).

12. The computer-implemented method of claim 1 further comprising receiving command input from the at least one client device.

\* \* \* \* \*

UNITED STATES PATENT AND TRADEMARK OFFICE
CERTIFICATE OF CORRECTION

| | | |
|---|---|---|
| PATENT NO. | : 8,517,841 B2 | Page 1 of 1 |
| APPLICATION NO. | : 13/587563 | |
| DATED | : August 27, 2013 | |
| INVENTOR(S) | : Stephen G. Perlman | |

It is certified that error appears in the above-identified patent and that said Letters Patent is hereby corrected as shown below:

In the Claims

Column 10, line 32, which is line 3 of claim 1, after "server, video game", insert --or application--.

Signed and Sealed this
Twenty-fifth Day of February, 2014

Michelle K. Lee
*Deputy Director of the United States Patent and Trademark Office*